United States Patent [19]

Monoghan

[11] 3,848,393

[45] Nov. 19, 1974

[54] PACKAGING MACHINE AND PROCESS

[75] Inventor: Alfred C. Monoghan, Warren, N.J.

[73] Assignee: Monaghan Automated Systems, Inc., Greenbrook, N.J.

[22] Filed: Dec. 18, 1972

[21] Appl. No.: 316,097

Related U.S. Application Data

[63] Continuation of Ser. No. 112,574, Feb. 4, 1971, abandoned.

[52] U.S. Cl.................. 53/22 A, 53/112 A, 53/141
[51] Int. Cl............................................. B65b 31/00
[58] Field of Search................ 53/22 A, 112 A, 141

[56] References Cited
UNITED STATES PATENTS

| | | | |
|---|---|---|---|
| 2,984,056 | 5/1961 | Scholl | 53/22 A |
| 3,071,905 | 1/1963 | Morse | 53/22 A |
| 3,204,384 | 8/1965 | Dallas | 53/22 A |
| 3,501,886 | 3/1970 | Watts et al. | 53/22 A |
| 3,587,200 | 6/1971 | Stone et al. | 53/22 A |

Primary Examiner—Travis S. McGehee
Attorney, Agent, or Firm—Arthur A. March

[57] ABSTRACT

There is provided a continuous uni-directional packaging machine which utilizes atmospheric pressure to conform a plasticized material to the contours of an article to be packaged. Heated air is used to form the plasticized material from a plastic film and an area of reduced atmospheric pressure is provided beneath the article and to a substrate, if desired, allowing atmospheric pressure to form the material about the article and to the substrate. A continuous moving foraminous belt carries the substrate and the articles placed in position thereon through at least one zone of reduced atmospheric pressure. A continuous film of softened plastic material is concurrently fed into position on the substrate and "tents" around article placed on the substrate and the package is formed in a zone of reduced pressure.

10 Claims, 5 Drawing Figures

FIG. I

PACKAGING MACHINE AND PROCESS

This is a continuation of application Ser. No. 112,574, filed Feb. 4, 1971, now abandoned.

BRIEF DESCRIPTION OF INVENTION

The instant invention relates to a novel process and apparatus for forming packages of articles which is known to the art as "skin" packages.

Briefly the invention consists of a process and apparatus which utilizes a combination of an air permeable, preferably a perforated or foraminous, endless belt, at least one, and preferably two vacuum chambers, and high velocity heated air to soften a film of a plastic material used as the top portion of the package.

The air permeable endless belt performs the function of continuously moving a package substrate over the vacuum chambers or zones of reduced pressure. At a point at the front of the vacuum and in a plane angled from the endless belt, there is continuously fed a film of plastic material which has previously been softened to a pliable or semi-plastic condition by contact with a forced current of heated air in a directing chamber which provides for intimate contact between the hot air and the film and recirculation of the air. The heated air has been found to impart a much more even transfer of heat to the film than presently used radiant heating elements and more successfully conditions the film for the subsequent packaging operation. It also allows instant cut off of the heat, permitting intermittent operation.

The point of conjunction of the sheet of conditioned film and the package substrate upon which the article is to be packaged is very important and the two package layers must come together just as they enter the forward edge of the first vacuum zone. This is due to the fact that the conditioned film is withdrawn from the roll by utilizing the air pressure differential created by the zone of reduced pressure and the ambient pressure immediately above the zone. Since the air pressure acts across the total surface of the conditioned film it is not necessary, as in prior art devices to firmly grasp the edges of the film to pull it from the supply roll. There is provided in the film conveying means an endless vacuum belt which holds the film in a flattened condition as it is being delivered to packaging position. This holding means, however, is merely to insure adequate contact with the heated air and that the film is extended to its full width for the packaging operation.

The conditioning high velocity heated air is maintained in continuous contact with the film throughout the zone of reduced pressure and is carefully controlled in both velocity and temperature so as to result in that degree of plasticity required to result in the desired package.

Another feature of the invention resides in the use of two successive zones of reduced pressure which are maintained, by means of motor driven vacuum blowers, at carefully controlled pressures below ambient pressure. It is normally the practice to maintain the first zone at a negative pressure which evacuates most of the air between the film and the substrate, and the second zone at an even more reduced pressure which brings the film into intimate contact with the product and the substrate to which it adheres. Maintaining the current of heated air in contact with the film through the zones of reduced pressure maintains the film in proper condition throughout the package forming operation and helps to insure the desired package formation.

The means for continuously moving the package substrate with articles placed thereon through the packaging operation comprises an endless belt of an air permeable material which permits air to be evacuated through it in the vacuum tanks. This endless belt, driven by a driving roller at one end and around an idler roller at the opposite end, is of a foraminous material such as a perforated stainless steel belt or the like. It is of a width chosen to accommodate the articles to be packaged, usually from five inches to 36 inches, and of a length chosen to allow for the desired packaging time. The belt may be driven by the driving pulley at a speed desired to accomplish the desired rate, for example from 10 to 80 lineal feet per minute.

The zones of reduced pressure are created by means of successive vacuum tanks open at the upper surfaces which are arranged immediately below the upper stretch of the endless foraminous belt and extend substantially across the width of the belt, at least to the extent necessary to expose the complete width of the substrate to reduced pressure.

The package substrate may be chosen from a wide range of commercially available materials such as paper board, fiber board, corrugated stock and the like, and for optimum adhesion can be coated with an adhesive. The substrate is preferably in the form of a continuous roll of stock, but of course may also be predimensioned strips or pieces. The substrate may also be a plastic film as will be hereinafter described.

The film which is used as the top layer — or skin — of the package may be any of the commercially available plastic films such as the polyolefin films, such as low or medium density polyethylene film, polyester films such as polyacrylate films, polymethacrylate films, polyethylterephthalates and the like, cellulosic films, such as regenerated cellulose (cellophane) ethyl cellulose, cellulose acetate, cellulose acetate butyrate, cellulose propionate, etc., the polyvinyl films such as polyvinyl chloride films, ionomer film, and the like. It is only necessary that the film be capable of being softened at operable temperatures and that it harden again when cooled.

The film conditioning means of the apparatus of this invention comprises a forced current of heated air which is confined in an open bottomed directing chamber to insure intimate contact with the film which is moved along the open bottom, from a point prior to its conjunction with the package substrate at the front of the zone of reduced pressure and thereafter until the package is completely formed and then recirculated and re-used. Heating is by means of the usual electrical heating elements, thermostatically controlled, and a motor driven fan forces the heated air in the directed path. The air circulating chamber is provided with a damper which closes when the belt stops, redirecting the heated air away from the film to prevent overheating or damage.

The temperature of the forced current of air is controlled so as to properly condition the film being used and will be dependent upon its softening point. For example, when using a low density polyethylene film a temperature of about 225° to 260° F is operable.

As was stated above, the substrate for the package may also be of a plastic film, perforated if desired, which is fed onto the endless belt from a stock roll. The film substrate may be any of those materials enumerated above and may be the same film selected as the top layer or different. If an air tight package is desired, then an alternate method can be used whereby the articles are placed either directly on the foraminous belt or on the substrate, or perforated film. An additional layer of film is now introduced below the package while passing over a third vacuum chamber which exhausts any air pockets in the lower surface as the film meets the product. It is preferable that a heating table be provided along the endless belt following the primary vacuum tanks when using a film substrate.

As will be readily apparent from the above description the process and apparatus of this invention is extremely flexible and may be adapted to form a wide variety of packages.

For example, a unique package may be prepared of open topped containers, such as fruit containers, cartons, and the like, by coating the sides of the container with an adhesive preparation which causes the covering film to adhere to the container sides. In this event, a substrate may or may not be used and the resulting carton will have the highly desirable transparent top which simultaneously protects the contents thereof and permits visual inspection.

One problem which presents itself in skin packages of the type contemplated herein is the difficulty encountered in opening them. It is usually necessary to employ a knife or other sharp implement to cut the film from around the article enwrapped, particularly in the case where a plurality of articles are packaged on a substrate. According to one embodiment of this invention, there is superimposed over the article being packaged, and underneath the film, a strip of a filamentous material such as a narrow tape, a cord, string and the like, so that the ends thereof extend to the edge of the package. This strip then serves as a "tear strip," and serves as an easy opener for rupturing the film so the packaged article may be easily and quickly removed.

The versatility of the process and apparatus of the inventive concept depends, to a great degreee, upon the fact that atmospheric pressure is used to conform a heat-softened film about the article to be enwrapped. Thus, by proper selection of film, substrate and the degree of vacuum provided package design may be varied within wide ranges. For example, using a substantially stiff substrate, such as a corrugated cardboard, for example, and maintaining a vacuum of the requisite degree, the overlapping film may be drawn to a tent-like configuration over the article to be packaged and the resulting package may be made to resemble the well known "blister-pack" type of package.

DETAILED DESCRIPTION OF INVENTION

The invention will be more clearly explained by reference to the accompanying drawings in which.

Figure 1:
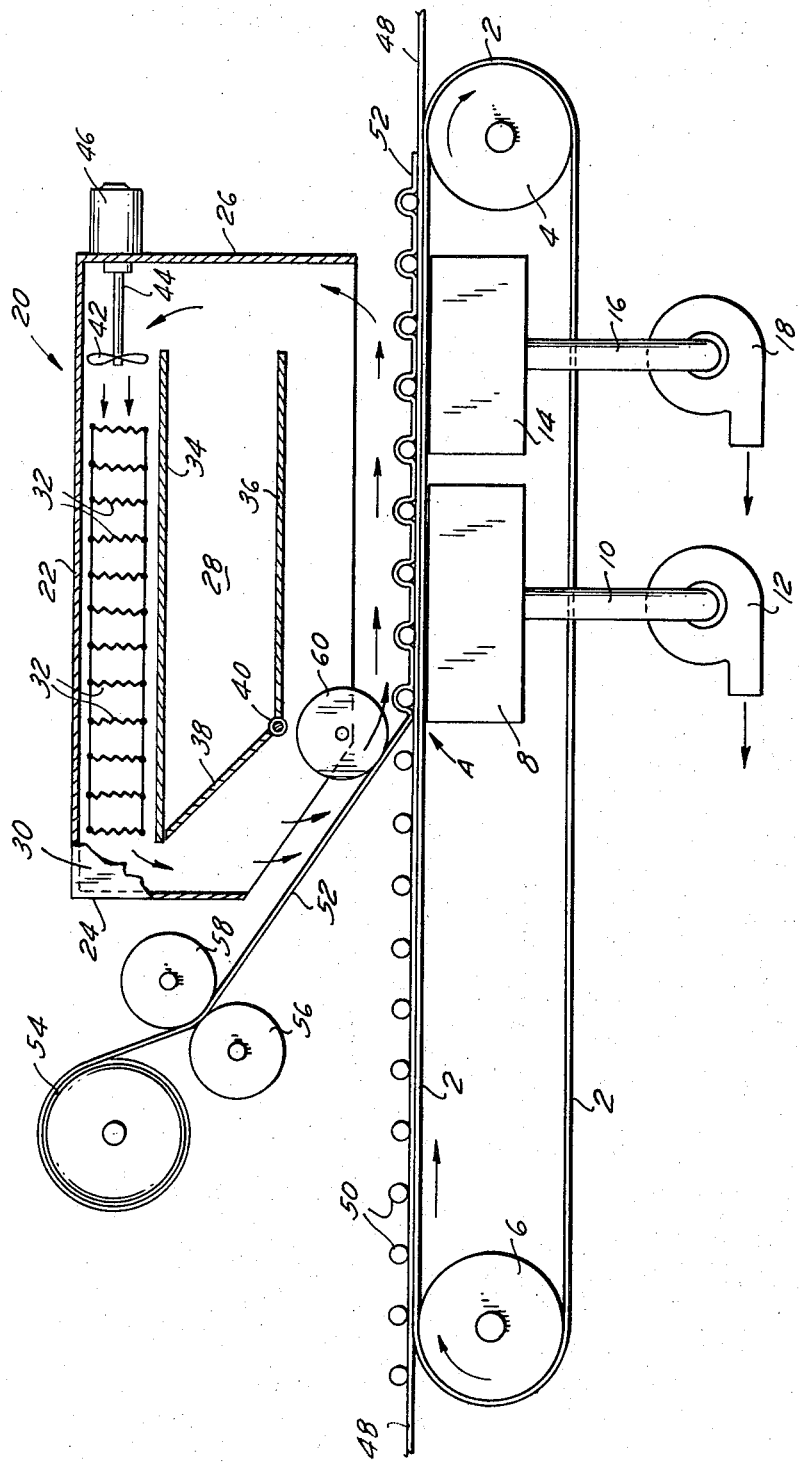
FIG. 1 represents a side plan view, partially in section, showing one embodiment of an apparatus of the invention.

Turning now to the drawings and particularly to FIG. 1, reference numeral 2 indicates an endless belt of a foraminous material which is driven in the direction of the arrow by driving roller 4 powered by a prime mover and a power train, not shown. Roller 6, which may be provided with belt tensioning and guiding devices known to the art, is adapted to serve to guide and tension the belt. Positioned beneath the surface of the upper stretch of endless foraminous belt 2 is a first vacuum tank 8 which is evacuated by means of exhaust line 10 and blower 12 driven by a power source, not shown, to create a first zone to reduced pressure. A second successive reduced pressure zone is created by a second vacuum tank 14, exhaust line 16 and blower 18. The second zone may also be contiguous with the first zone.

Positioned above the upper stretch of endless belt 2, and generally indicated at 20 is the film conditioning chamber, which is an open bottomed structure designed to direct a flow of conditioning air along the upper surface of a plastic film moving along the open bottom thereof.

Positioned in the upper portion of the chamber, formed by top 22, ends 24 and 26, and sides 28 and 30, are heating elements 32. These heating elements are preferably radiant heaters using electrical power, but may also be gas fired burners and the like.

A directing chamber is formed within the conditioning chamber by means of a top 34, a bottom 36, and a damper means or mechanism 38, which pivots about pivot rod 40. The directing chamber is defined by the outer surfaces of top 34, damper 38 and bottom 36 and the inner surfaces of the air conditioning chamber.

Positioned in the upper portion of the directing chamber is an air circulating or forcing means which comprises fan 42, driven by shaft 44 and motor 46. This circulating fan forces a current of air across heating elements 32 and thereafter through the directing chamber and across the surface of the plastic film.

Damper means 38 may be electrically controlled so that it is positioned in an open position when belt is moving or closed when stopped and thus diverts the forced current of heated air from the directing chamber. Opening the damper means 38, that is, pivoting it in a counterclockwise direction about pivot rod 40, diverts the conditioned air to the interior of the space defined by top 34, damper 38 and bottom 36 and away from the film surface thus effectively preventing the overheating of the film when stationary.

In operation a package substrate 48 is placed upon the endless belt 2 and articles to be packaged, 50, are loaded thereon. At the start of the operation, plastic film 52 from supply roll 54, is threaded through guide rollers 56 and 58 and attached to substrate 48 at point A as shown in FIG. 1, that is, at a point at the beginning of the first zone of reduced pressure created by vacuum tank 8. The conditioning unit is then started and when up to operating temperature, driving roller 4 is powered and blowers 12 and 18 are activated. As the substrate is moved across the first zone of reduced pressure, the pressure differential causes the conditioned film to form around the articles 50 and to the upper surface of substrate 48.

In addition to forming the conditioned film tightly to the articles and the substrate, the force exerted by the ambient pressure actin across the total area of film 52 serves to play it from the full width drive rolls 56 and 58, which have pulled the film off the feed roll 54, thus eliminating the need for additional feeding rolls, feeding fingers and the like.

As the enwrapped articles move across the first zone of reduced pressure, more air is evacuated from the space between the conditioned film and the substrate and the finishing steps are accomplished during the travel of the package strip through the second reduced pressure zone. The forming package is subjected to the action of the conditioned air throughout its residence in the reduced pressure zone and thus air evacuation continues. The pressure exerted upon the forming package in the first reduced pressure zone is preferably greater than that of the second zone, the vacuum created in vacuum tank 8 being greater than that in vacuum tank 14. This permits for a packaging finishing operation of greater efficiency, the bulk of the rapid evacuation occurring in the first zone and at a slower rate in the second zone.

Figure 2:
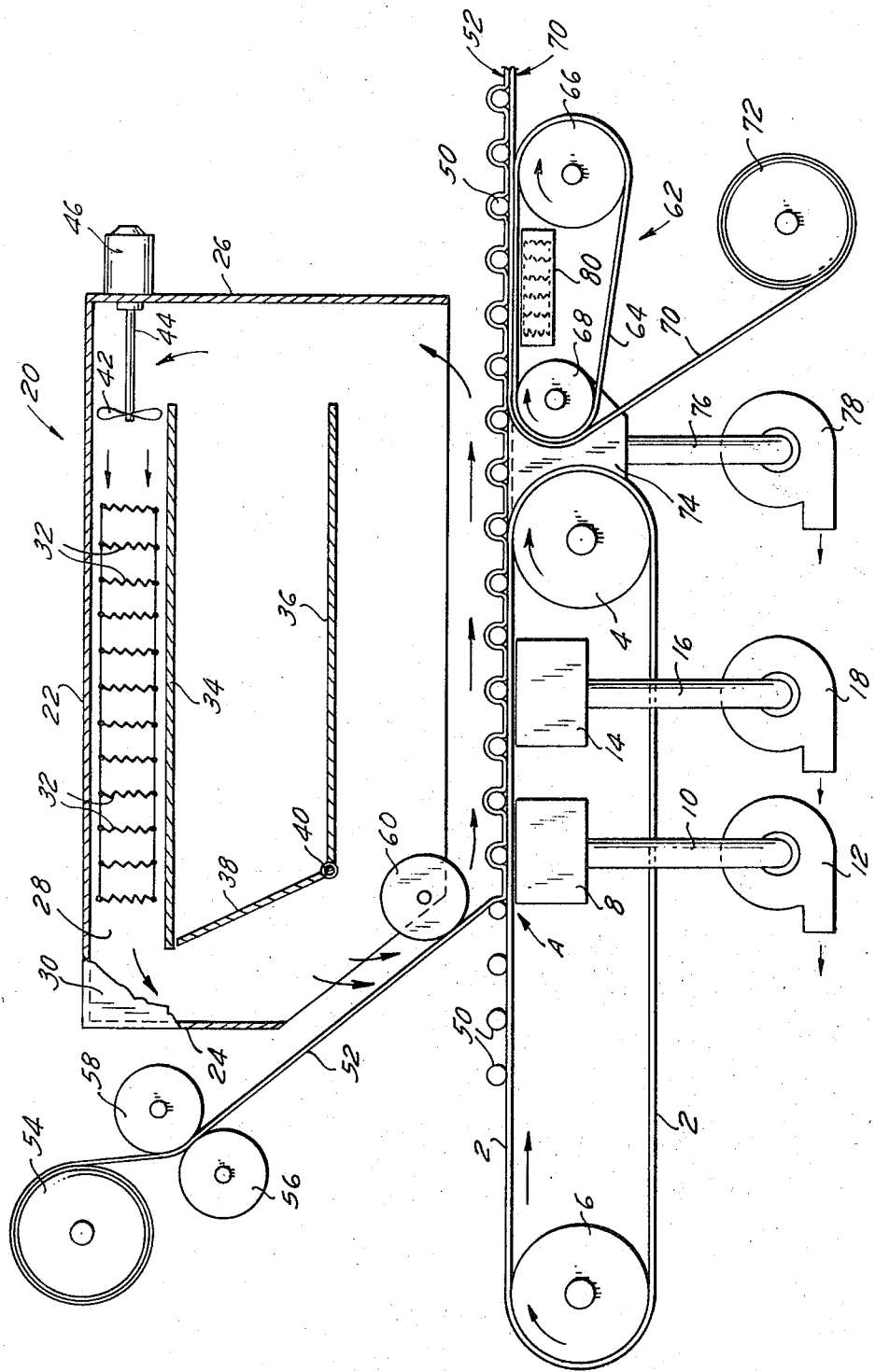
FIG. 2 is a side plan view, partially in section, showing a second embodiment.

FIG. 2 discloses a second embodiment for the use of the present apparatus in connection with vacuum packaging such as for foodstuffs and the like.

It has been heretofore well known that vacuum packaged foodstuffs were produced on highly expensive equipment in which the pocket forming and sealing apparatus were highly complex and difficult to maintain. With the use of the present invention however, as shown in the embodiment in FIG. 2, there is provided a relatively simple extension to the machine heretofore described. In this embodiment the endless belt 2 is sterilized and receives foodstuffs or the like. The film 52 is applied over the product conveyed by said endless belt to the point of meeting a subsequent conveying system, generally indicated by the numeral 62. This system comprises another endless belt 64 driven by drive roller 66 around roller 68 which is equipped with tensioning and adjusting means not shown. In this embodiment belt 2 and belt 64 are preferably of the heat resistant substance as a Teflon or similar material which has a low coefficient of adhesion. A package substrate film 70, from film supply roll 72, is fed to the auxiliary conveying system being initially fed to belt 64 at the start of the vacuum packaging operation.

Another zone of reduced pressure is provided by means of vacuum tank 74, exhaust line 76 and motor driven blower 78. This zone evacuates any air from between film substrate 70 and top film 52 at its point of confluence at the top surface of belt 64. For the reason that a substrate of board is not used in this embodiment of the present invention, the second zone of reduced pressure provided by vacuum tank 8 may or may not be utilized prior to the evacuation of air by the vacuum tank 74.

After forming the vacuum, a heater 80 is provided below the surface of belt 64 which serves to effectively seal top film 52 to film substrate 70, thus forming an all film, air-tight package around articles 50.

It will be understood that with the use of the foregoing conveyor system, food such as meat, may be packaged in sterilized condition between an overlay and a substrate of film in a vacuum package which will inhibit any deterioration of the food. This development eliminates the need for additional operations such as slitting or other types of vacuum forming apparatus. Furthermore, the important advantage to ecology is obtained in the easily disposable film which is used to vacuum pack food with the use of the apparatus of the present invention.

Various means, including manual and automatic, may be utilized to sever and individualize the continuous strip of packages. These means are not shown as they are not a part of the present inventive concept.

Figure 3:
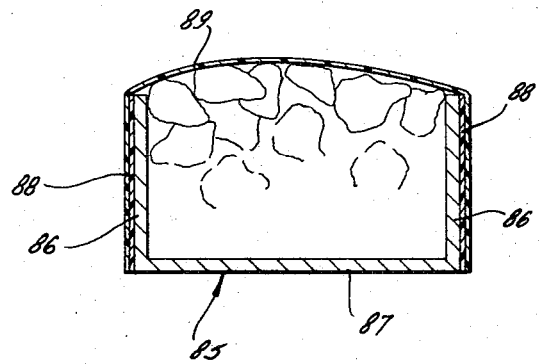
FIG. 3 represents a cross sectional view of a one-type package made in accordance with the inventive concept having a see-through top.
Figure 4:
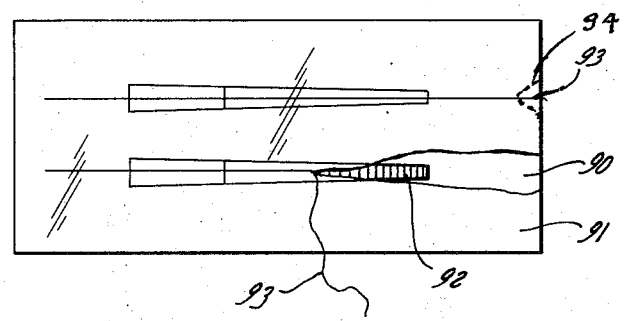
FIG. 4 is a top plan view of another package which incorporates an easy opening feature.

Turning now to FIGS. 3 - 4, there are shown examples of the various type of packages which may be fabricated on the apparatus of this invention.

FIG. 3 depicts a "see-through" type of package, such as a carton or tray of fruit, or the like. A package is formed which firmly but gently holds a plurality of objects in a compact easy handling unit.

Informing the package of this type, a container, such as a box, tray or the like of an air permeable material such as cardboard, pressed board, fiber board, fiber mat or the like, generally designated at 85, having sides 86 and a bottom 87, is coated with an adhesive material 88. The adhesive material, which may be any of the commonly known adhesives, selected so as to adhere the material of the carton to the overwrap material, is applied to sides 86 of the carton. The carton, with the adhesive coated sides, is placed on the foraminous belt of the apparatus of the invention and the film 89 is pressed tightly around the carton in the zone of reduced pressure adhering to the sides and forming the carton shown in FIG. 3 when the film ends are trimmed flush with bottom 87.

One problem with packages of the type contemplated herein concerns the opening of the package on the part of the consumer. It is usually necessary to obtain a knife or other sharp instrument to open a well packaged item to remove it for use, and often such is not readily available.

With the apparatus of this invention, packages which are readily opened without recourse to extraneous items may be readily prepared. One such package is illustrated in FIG. 4. In this package the substrate 90 is fed as in the normal manner, articles such as a nail file 92, or the like is placed thereon, and a continuous filament, such as a thread or strin 93, is fed so as to be disposed over the article, and along its long axis, so that it is covered by film 91. A scored portion 94 of the substrate underlies the string 93. When the scored portion 94a is removed the string 93 is exposed. Thus, the completed package may be readily opened by simply pulling the tear string 93, the string cutting the film as it is pulled with the application of force vertical to the substrate 90 and exposing the article 92.

Figure 5:
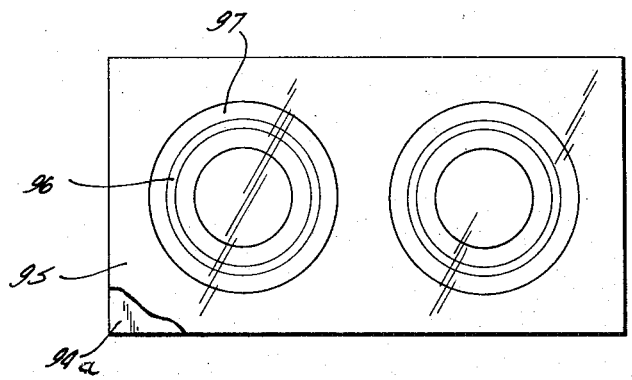
FIG. 5 is a top plan view of another type of package which may readily be made with the versatile apparatus of this invention.

Another example of the versatility of the apparatus of this invention is demonstrated by the package illustrated in FIG. 5. This package represents one very popular type of container known to the art as the "blister pack." It has advantages in certain applications such as visibility, holding an article to the substrate with only vertical pressure, etc. Ordinarily this type of package is fabricated of a very heavy film which is pre-shaped to the general conformation of the article; the article inserted on the pre-formed "blister;" and the substrate applied.

Using the apparatus of this invention a "blister pack" package is prepared by interposing between a substrate 94a and a film 95, an article such as a rubber retaining ring 96, and adjusting the pressure in the zone of reduced pressure to one at which the film is formed around the article so as to leave the blister 97 well defined and to exert pressure only downwardly on the top of article 96. Thus with the same materials as used for general packaging techniques, and by a simple adjustment of pressure, this popular and useful package may be prepared.

What is claimed is:

1. A process for the continuous skin packaging of articles which comprise the steps of:

forming at least two zones of reduced pressure, providing said first zone with an area of greater reduced pressure than the pressure in said second zone to evacuate the bulk of the air in said first zone, continuously moving a packaging substrate upon which the articles are sequentially directed through said zones, continuously softening a film of plastic material, and continuously feeding said softened film at an angle to said substrate to the front of said zones and in sequence over the articles positioned on said substrate whereby said film is shaped around the articles and adhered to itself.

2. A process according to claim 1 wherein a current of air at elevated temperatures is directed against said film of plastic material to soften it.

3. A packaging apparatus which comprises:

means for establishing first and second successive zones of reduced pressure, said first zone being provided with an area of greater reduced pressure than said second zone to rapidly evacuate the bulk of air pressure in the first zone, an article substrate upon which articles are sequentially placed, means for continuously and successively moving articles on the substrate through said zones, a continuous film of plastic material, means for continuously and progressively softening the film of plastic material, means for continuously feeding said softened film at an angle to said substrate to the forward edge of said zones and over the articles positioned on said substrate, said softened film contacting said substrate at the forward edge of said first zone, and means to shape the softened film around the articles on the substrate and to cause it to adhere to said substrate.

4. An apparatus according to claim 3 wherein said substrate is a sheet of an air permeable material.

5. An apparatus according to claim 3 wherein said substrate is a fiber board.

6. An apparatus according to claim 3 wherein said substrate is a plastic film.

7. An apparatus according to claim 3 wherein said softening means is a forced current of heated air.

8. An apparatus according to claim 3 wherein said softening means comprises at least one heating element, a directing chamber, and means for forcing air across said heating element and through said directing chamber.

9. An apparatus according to claim 3 wherein said moving means comprises an air permeable endless belt.

10. An apparatus according to claim 3 wherein said moving means comprises a motor-driven continuous foraminous belt.

* * * * *